US010050510B2

United States Patent
Ohhashi

(10) Patent No.: US 10,050,510 B2
(45) Date of Patent: Aug. 14, 2018

(54) MAGNETIC GEAR DEVICE

(71) Applicant: HITACHI METALS, LTD., Tokyo (JP)

(72) Inventor: Hiromitsu Ohhashi, Takasaki (JP)

(73) Assignee: Hitachi Metals, Ltd., Tokyo (JP)

(*) Notice: Subject to any disclaimer, the term of this patent is extended or adjusted under 35 U.S.C. 154(b) by 190 days.

(21) Appl. No.: 15/027,880

(22) PCT Filed: Aug. 29, 2014

(86) PCT No.: PCT/JP2014/072707
§ 371 (c)(1),
(2) Date: Apr. 7, 2016

(87) PCT Pub. No.: WO2015/053005
PCT Pub. Date: Apr. 16, 2015

(65) Prior Publication Data
US 2016/0241123 A1    Aug. 18, 2016

(30) Foreign Application Priority Data

Oct. 9, 2013  (JP) ................. 2013-212114

(51) Int. Cl.
*H02K 49/10*  (2006.01)
*F16H 49/00*  (2006.01)
*H02K 16/02*  (2006.01)

(52) U.S. Cl.
CPC ........... *H02K 49/102* (2013.01); *F16H 49/00* (2013.01); *H02K 16/02* (2013.01); *H02K 49/106* (2013.01); *H02K 2201/06* (2013.01)

(58) Field of Classification Search
CPC ........ F16H 49/00; H02K 16/02; H02K 49/10; H02K 49/102; H02K 49/104; H02K 49/106

(Continued)

(56) References Cited

U.S. PATENT DOCUMENTS

| 4,888,512 A * | 12/1989 | Shimizu ............... H01F 1/0577 148/104 |
| 5,105,113 A | 4/1992 | Ishikura et al. |
| 7,034,424 B2 * | 4/2006 | Kometani ............. H02K 1/278 310/156.47 |
| 8,482,171 B2 * | 7/2013 | Edwards ............. H02K 49/102 310/103 |

(Continued)

FOREIGN PATENT DOCUMENTS

| JP | H 03-74164 A | 3/1991 |
| JP | 2001-037113 A | 2/2001 |

(Continued)

OTHER PUBLICATIONS

Niguchi et al., "Study on Transmission Torque Characteristics of a Surface-Permanent-Magnet-Type Magnetic Gear," IEEJ Trans. 1A, vol. 131, No. 3, pp. 396-402 (2011).

(Continued)

*Primary Examiner* — Burton Mullins
(74) *Attorney, Agent, or Firm* — Muncy, Geissler, Olds & Lowe, P.C.

(57) ABSTRACT

Cylindrical outer and inner rotors coaxially supported so as to be rotatable, and a cylindrical stator interposed between the rotors are provided, and rotational torque is transmitted between the outer rotor and the inner rotor by interaction between: a plurality of magnets uniformly arranged on the inner circumference of the outer rotor; a plurality of magnets uniformly arranged on the outer circumference of the inner rotor; and a plurality of magnetic bodies juxtaposed at equal intervals in the circumferential direction of the stator. Rod-shaped magnetic bodies extending in the axial direction of the stator are used, and each magnetic body is placed in skew arrangement with a deviation amount in the circumferential direction corresponding to $\frac{1}{12}$ to $\frac{1}{4}$ of the juxtaposition pitch in the circumferential direction between one axial end and the other axial end. Such arrangement can effectively reduce cogging torque, and realize stable power transmission under small torque fluctuation while ensuring high torque density.

2 Claims, 6 Drawing Sheets

(58) Field of Classification Search
USPC .......................................... 310/103, 156.47
See application file for complete search history.

(56) References Cited

U.S. PATENT DOCUMENTS

| | | | | |
|---|---|---|---|---|
| 8,598,759 | B2* | 12/2013 | Edwards | H02K 49/06 |
| | | | | 310/103 |
| 8,736,125 | B2* | 5/2014 | Ohhashi | H02K 49/02 |
| | | | | 310/103 |
| 2011/0012458 | A1* | 1/2011 | Atallah | H02K 49/102 |
| | | | | 310/103 |
| 2011/0057456 | A1* | 3/2011 | Atallah | H02K 49/102 |
| | | | | 290/1 C |
| 2014/0132099 | A1 | 5/2014 | Nakatsugawa et al. | |
| 2014/0167546 | A1 | 6/2014 | Sutani et al. | |

FOREIGN PATENT DOCUMENTS

| | | |
|---|---|---|
| JP | 2009-027777 A | 2/2009 |
| JP | 2011-033166 A | 2/2011 |
| JP | 2012-005218 A | 1/2012 |
| JP | 2013-047546 A | 3/2013 |
| JP | WO 2013/001557 A1 | 2/2015 |
| JP | WO 2013/011809 A1 | 2/2015 |
| WO | WO 2009/087409 A1 | 7/2009 |

OTHER PUBLICATIONS

Japanese Office Action for Japanese Application No. 2015-541474 dated Dec. 6, 2016 with English translation.

\* cited by examiner

A : 1/32
B : 1/16
C : 1/12
D : 1/8
E : 1/4
F : 1/2

MAGNETIC GEAR DEVICE

CROSS-REFERENCE TO RELATED APPLICATIONS

This application is the national phase under 35 U.S.C. § 371 of PCT International Application No. PCT/JP2014/072707 which has an International filing date of Aug. 29, 2014 and designated the United States of America.

FIELD

The present invention relates to a magnetic gear device which utilizes magnetism for transmitting power contactlessly.

BACKGROUND

In recent years, a magnetic gear device has attracted attention as means for transmitting power between rotation shafts. A magnetic gear device is constructed by supporting an inner magnet cylinder, an outer magnet cylinder and a magnetic body cylinder, which respectively have a cylindrical shape, in a coaxial manner with the magnetic body cylinder interposed between the magnet cylinders. On the outer circumference of the inner magnet cylinder and on the inner circumference of the outer magnet cylinder, a plurality of rod-shaped magnets extending in the axial direction are respectively arranged uniformly. The magnetic body cylinder is constructed by aligning a plurality of rod-shaped magnetic bodies at equal intervals in the circumferential direction and holding the magnetic bodies with nonmagnetic holders respectively located between magnetic bodies. The number of the uniformly arranged magnets on the inner magnet cylinder is different from the number of the uniformly arranged magnets on the outer magnet cylinder, and the respective magnets are magnetized in a manner such that different magnetic poles lie adjacent to each other in the circumferential direction. Moreover, the number of the juxtaposed magnetic bodies on the magnetic body cylinder is different from the respective numbers of magnets on the magnet cylinders.

In a magnetic gear device, for example, an inner magnet cylinder and an outer magnet cylinder function as rotors supported to be rotatable, a magnetic body cylinder functions as a stator supported to be non-rotatable, and magnetomotive force of one of the inner rotor and the outer rotor is modulated by the magnetic bodies provided on the stator, so that magnetomotive force having a different waveform is given to the other rotor. In such a manner, the magnetic gear device is used for transmitting power (rotational torque) by gear shifting (deceleration, acceleration) between both rotors and rotation shafts which rotate integrally with the rotors.

A magnetic gear device has advantages that contactless power transmission can be achieved, generation of vibration or noise in operation can be suppressed, and lubrication is unnecessary and therefore the maintainability is improved. Moreover, the transmission gear ratio and the rotational direction can be suitably set by selecting the number of the juxtaposed magnets on the inner and outer rotors and the number of the juxtaposed magnetic bodies on the stator. Furthermore, in recent years, high torque density (largest transmission torque per unit size) can be obtained by applying strong magnetic force with a rare earth-iron-boron based magnet or the like. Due to such circumstances, it is eagerly desired to employ a magnetic gear device instead of various gear devices which realize gear shift transmission using a plurality of gears mechanically engaged with each other.

However, torque transmission in a magnetic gear device has a problem that attractive force between magnets on the rotors sequentially changes with relative rotation of the inner rotor and the outer rotor, which function as magnet cylinders, and therefore cogging torque is generated and transmission torque between the rotation shafts periodically fluctuates.

Such torque fluctuation is an unpreferable phenomenon for power transmission means, and reduction of cogging torque is an important issue in practical application of a magnetic gear device.

It is disclosed in Patent Document 1 (Japanese Patent Application Laid-Open No. 2013-47546) that cogging torque can be reduced by providing magnetic bodies (magnetic tooth portions) of a stator, which is configured as a magnetic body cylinder, in a skewed manner with respect to the axial direction of the stator.

Moreover, it is disclosed in Non-Patent Document 1 (Noboru Niguchi and two others, "Study on Transmission Torque Characteristics of a Surface-Permanent-Magnet-Type Magnetic Gear", IEEJ Transactions on Industry Applications, Vol. 131 No. 3, 2011, pp. 396-402) that magnets of an inner rotor (high-speed rotor), which is configured as a magnet cylinder, are provided in a skewed manner in two steps, so that cogging torque is reduced.

SUMMARY

However, the disclosure of Patent Document 1 only refers to placing magnetic tooth portions in skew arrangement and not to how much skew (amount, angle) is required for effective reduction of cogging torque.

Moreover, it is theoretically described in Non-Patent Document 1 that skew arrangement of magnets in a high-speed rotor is effective for reduction of cogging torque, though the cogging torque reduction effect by skew arrangement in two steps is stated as a limited effect, and no effective cogging torque reduction measure is disclosed.

The present invention has been made in view of such circumstances, and an object thereof is to provide a magnetic gear device which can effectively reduce cogging torque and realize stable power transmission under small torque fluctuation while ensuring high torque density.

A magnetic gear device according to the present invention is a magnetic gear device for transmitting rotational torque, comprising: a cylindrical inner magnet cylinder having a plurality of magnets juxtaposed on the outer circumference; a cylindrical outer magnet cylinder having a plurality of magnets juxtaposed on the inner circumference; and a cylindrical magnetic body cylinder having a plurality of magnetic bodies juxtaposed at equal intervals in the circumferential direction, wherein the inner magnet cylinder, the outer magnet cylinder and the magnetic body cylinder are supported in a coaxial manner with the magnetic body cylinder interposed between the inner magnet cylinder and the outer magnet cylinder, and any two of the inner magnet cylinder, the outer magnet cylinder and the magnetic body cylinder function as rotors and the other functions as a stator, characterized in that the magnetic bodies have rod shapes extending in the axial direction of the magnetic body cylinder and are placed in skew arrangement with a deviation amount in the circumferential direction corresponding to $\frac{1}{12}$ to $\frac{1}{4}$ of the juxtaposition pitch in the circumferential direction between one axial end and the other axial end.

In the present invention, a cogging torque reduction effect is verified by varying the skew amount in a structure wherein magnetic bodies juxtaposed on a magnetic body cylinder are placed in skew arrangement, and the deviation amount in the circumferential direction between one axial end and the other axial end of each magnetic body is set on the basis of the result to be $1/12$ to $1/4$ of the juxtaposition pitch of the magnetic bodies on the circumference of the magnetic body cylinder, so that deterioration of torque density is suppressed and efficient reduction of cogging torque is achieved.

Moreover, a magnetic gear device according to the present invention is a magnetic gear device for transmitting rotational torque, comprising: a cylindrical inner magnet cylinder having a plurality of magnets juxtaposed on the outer circumference; a cylindrical outer magnet cylinder having a plurality of magnets juxtaposed on the inner circumference; and a cylindrical magnetic body cylinder having a plurality of magnetic bodies juxtaposed at equal intervals in the circumferential direction, wherein the inner magnet cylinder, the outer magnet cylinder and the magnetic body cylinder are supported in a coaxial manner with the magnetic body cylinder interposed between the inner magnet cylinder and the outer magnet cylinder, and any two of the inner magnet cylinder, the outer magnet cylinder and the magnetic body cylinder function as rotors and the other functions as a stator, characterized in that the magnetic bodies have rod shapes extending parallel to the axial direction of the magnetic body cylinder, and the magnets on the inner magnet cylinder and the magnets on the outer magnet cylinder are placed in skew arrangement with deviation in the same direction in the respective circumferential directions between one axial end and the other axial end.

In the present invention, the magnets on the inner magnet cylinder are placed in skew arrangement, and the magnets on the outer magnet cylinder are also placed in skew arrangement in the same direction, so that cogging torque is reduced.

Furthermore, a magnetic gear device according to the present invention is characterized in that the deviation amount of the magnets on the inner magnet cylinder and the deviation amount of the magnets on the outer magnet cylinder are set at $1/12$ to $1/4$ of the juxtaposition pitch of the magnetic bodies on the circumference of the magnetic body cylinder.

In the present invention, a proper skew amount for the magnets on the inner and outer magnet cylinders is verified, and the deviation amount of the respective magnets is set on the basis of the result to be $1/12$ to $1/4$ of the juxtaposition pitch of the magnetic bodies on the circumference of the magnetic body cylinder, so that efficient reduction of cogging torque is achieved without causing deterioration of torque density.

With a magnetic gear device according to the present invention wherein magnetic bodies juxtaposed on a magnetic body cylinder, or magnets uniformly arranged on an inner or outer magnet cylinder are properly placed in skew arrangement on the basis of the verification result, it becomes possible to effectively reduce cogging torque while ensuring high torque density and realize stable power transmission under small torque fluctuation.

The above and further objects and features will more fully be apparent from the following detailed description with accompanying drawings.

DETAILED DESCRIPTION

Figure 1:
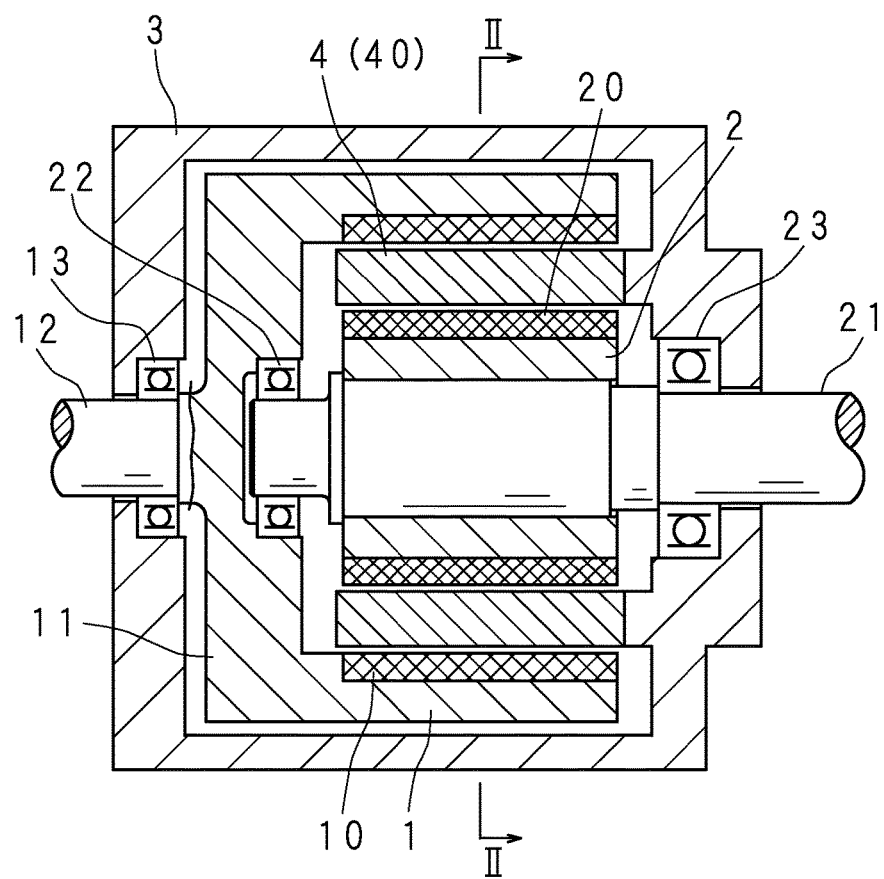
FIG. 1 is a longitudinal sectional view which schematically illustrates a magnetic gear device according to Embodiment 1.
Figure 2:
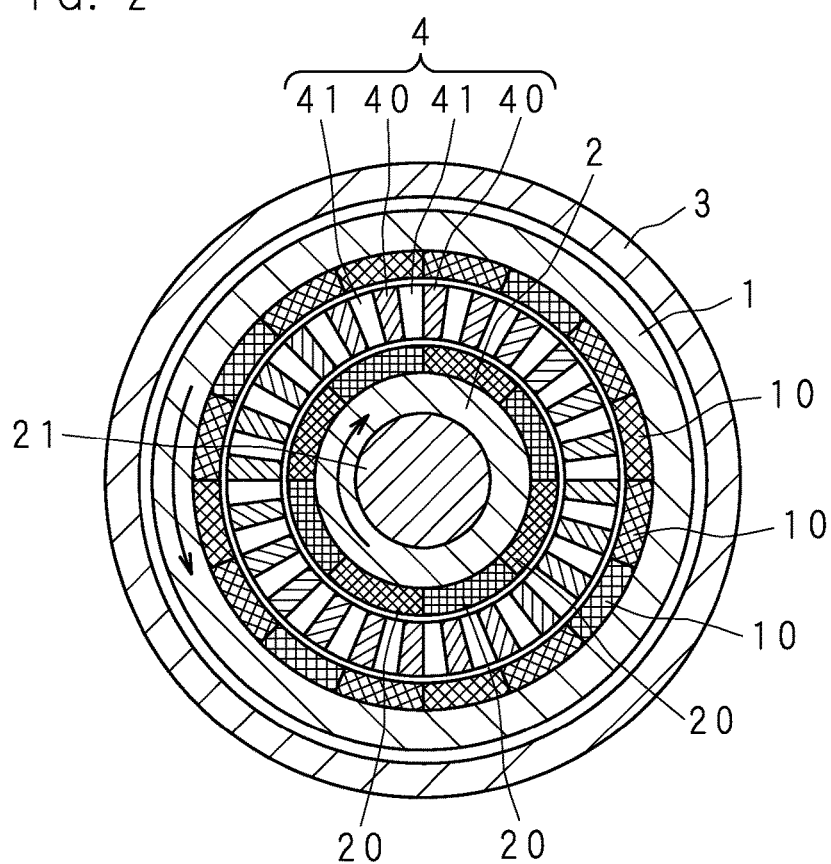
FIG. 2 is a cross sectional view cut along the line II-II in FIG. 1.

The following description will explain the present invention in detail on the basis of drawings which illustrate embodiments thereof. FIG. 1 is a longitudinal sectional view which schematically illustrates a magnetic gear device according to Embodiment 1, and FIG. 2 is a cross sectional view cut along the line II-II in FIG. 1. The illustrated magnetic gear device is provided with an outer rotor 1 and an inner rotor 2, which respectively have a cylindrical shape, inside a housing 3.

The outer rotor 1 has a rotation shaft 12 coaxially protruded from a base plate 11 provided on one side, and the rotation shaft 12 is supported at one side end wall of the housing 3 via a bearing 13. On the inner circumference of the outer rotor 1, a plurality of rod-shaped magnets 10 extending in the axial direction are juxtaposed in uniform arrangement in the circumferential direction. The number of the magnets 10 illustrated in FIG. 2 is sixteen, and the respective magnets 10 are magnetized in the radial direction of the outer rotor 1 and are arranged in a manner such that different magnetic poles lie adjacent to each other in the circumferential direction.

The inner rotor 2 has a rotation shaft 21 coaxially fitted into and fixed to the inner circumference, and one side of the rotation shaft 21 is supported at a central portion of the base plate 11 of the outer rotor 1 via a bearing 22, and the other side is likewise supported at the other side end wall of the housing 3 via a bearing 23. The inner rotor 2 supported in such a manner is coaxially located inside the outer rotor 1 so as to be rotatable about the shaft center together with the rotation shaft 21. The bearing 22 also functions to support the outer rotor 1, and the outer rotor 1 is made rotatable about the shaft center together with the rotation shaft 12 while maintaining coaxiality with the inner rotor 2 by the operation of the bearings 13 and 22 on both sides.

On the outer circumference of the inner rotor 2, a plurality of rod-shaped magnets 20 extending over the total length in the axial direction are juxtaposed in uniform arrangement in the circumferential direction. The number of the magnets 20 illustrated in FIG. 2 is eight, which is different from the number of the magnets 10 on the outer rotor 1. The respective magnets 20 are magnetized in the radial direction of the inner rotor 2, and are arranged in a manner such that different magnetic poles lie adjacent to each other in the circumferential direction as with the magnets 10 on the outer rotor 1.

The magnets 10, 10 . . . uniformly arranged on the inner circumference of the outer rotor 1 and the magnets 20, 20 . . . uniformly arranged on the outer circumference of the inner rotor 2 face each other at a suitable interval in the radial direction, and a cylindrical stator 4 is located between the facing portion to be coaxial therewith. As illustrated in FIG. 2, the stator 4 is configured by aligning a plurality of magnetic bodies 40 at equal intervals in the circumferential direction and holding the magnetic bodies 40 with nonmagnetic holders 41 respectively located between magnetic bodies 40. The number of the magnetic bodies 40 illustrated in FIG. 2 is twenty four, which is different from the number of the magnets 10 on the outer rotor 1 and from the number of the magnets 20 on the inner rotor 2.

As illustrated in FIGS. 1 and 2, the outer circumference of the stator 4 faces the magnets 10 uniformly arranged on the inner circumference of the outer rotor 1 with a minute clearance, and the inner circumference of the stator 4 likewise faces the magnets 20 uniformly arranged on the outer circumference of the inner rotor 2 with a minute clearance. Such a stator 4 may be formed integrally with the other side end wall (end wall on a support side of the rotation shaft 21) of the housing 3 as illustrated in FIG. 1, or may be formed separately from the housing 3 and then fixed to the other end wall while maintaining coaxiality with the outer rotor 1 and the inner rotor 2.

Figure 3:
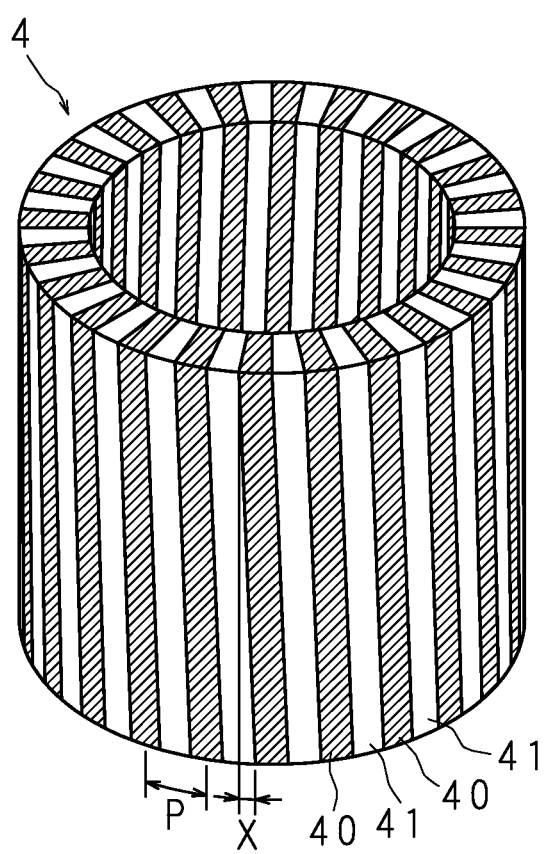
FIG. 3 is a perspective view which schematically illustrates the appearance of a stator.

FIG. 3 is a perspective view which schematically illustrates the appearance of the stator 4. As illustrated in this figure, each magnetic body 40 has a rod shape extending in the axial direction of the stator 4, and is not parallel to the axial direction but is placed in skew arrangement with a predetermined deviation amount in the circumferential direction between one axial end and the other axial end. The deviation amount X of each magnetic body 40 is set on the basis of a juxtaposition pitch P of the magnetic bodies 40, 40 . . . aligned in the circumferential direction of the stator 4, and the deviation amount X of each magnetic body 40 on the stator 4 illustrated in FIG. 3 is set at approximately ¼ of the juxtaposition pitch P.

The magnetic gear device having such a structure is used as power transmission means for transmitting rotational torque from a rotation driving source to a rotational load, by coupling a shaft end of the rotation shaft 12, which is protruded to one side of the housing 3, with a proper rotational load, and coupling a shaft end of the rotation shaft 21, which is protruded to the other side, with the rotation driving source such as a motor, for example. The inner rotor 2 is rotated together with the rotation shaft 21 by transmission from the rotation driving source. When the inner rotor 2 rotates, the magnets 20, 20 . . . uniformly arranged on the outer circumference relatively rotate and successively cross the magnetic bodies 40, 40 . . . juxtaposed on the stator 4, and magnetic force of each magnet 20 is modulated by the magnetic bodies 40, 40 . . . , so that magnetomotive force having a different waveform is given to the magnets 10, 10 . . . juxtaposed on the inner circumference of the outer rotor 1, and rotation of the inner rotor 2 is transmitted to the outer rotor 1.

In the illustrated magnetic gear device, the outer rotor 1 rotates in a direction opposite to the rotational direction of the inner rotor 2 at a speed lower than that of the inner rotor 2 as indicated by the arrow in FIG. 2, and deceleration transmission from the rotation driving source to the rotational load is realized. The magnetic gear device can also be used by coupling the rotation shaft 12 with a rotation driving source and coupling the rotation shaft 21 with a rotational load. In such a case, acceleration transmission from the rotation driving source to the rotational load is realized.

It is to be noted that the rotational direction of the rotation shafts 12 and 21, and the transmission gear ratio (deceleration ratio or acceleration ratio) between the rotation shafts 12 and 21 can be suitably set depending on a combination of the number of the uniformly arranged magnets 10 on the outer rotor 1 and the uniformly arranged magnets 20 on the inner rotor 2, and the number of the juxtaposed magnetic bodies 40 on the stator 4. Moreover, high torque density can be ensured by using magnets having strong magnetic force such as rare earth-iron-boron based magnets as the magnets 10, 10 . . . on the outer rotor 1 and the magnets 20, 20 . . . on the inner rotor 2, so that the clearance between the magnets 10 or 20 and the magnetic bodies 40, 40 . . . juxtaposed on the stator 4 is minimized.

In such rotation transmission, the aforementioned skew arrangement of the magnetic bodies 40, 40 . . . on the stator 4 functions to reduce cogging torque accompanied by relative rotation of the outer rotor 1 and the inner rotor 2, and to reduce fluctuation of output torque to be extracted to the rotation shaft 12 (or rotation shaft 21).

Figure 4:
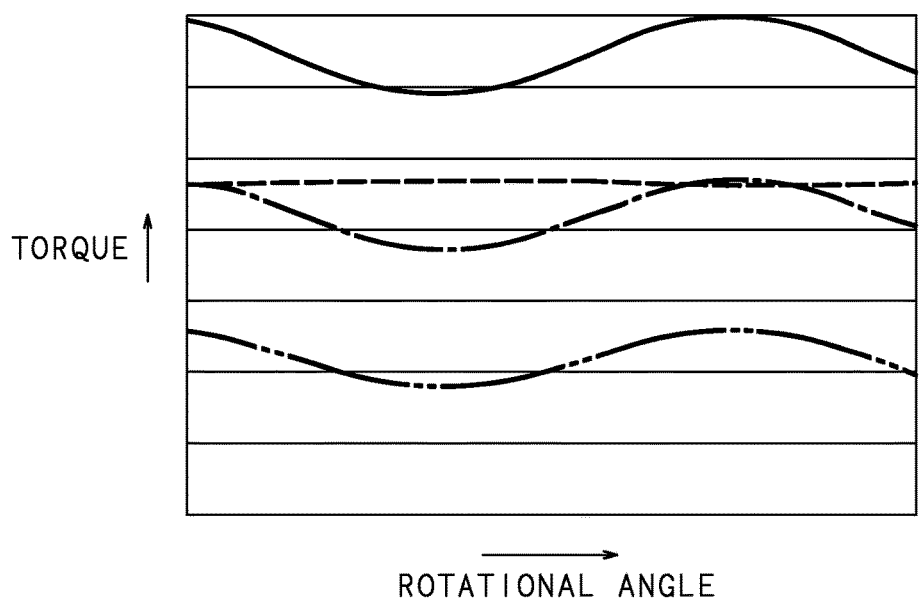
FIG. 4 is an explanatory drawing of a cogging torque reduction effect by skew arrangement.

FIG. 4 is an explanatory drawing of a cogging torque reduction effect by skew arrangement, and illustrates a measurement result of output torque to be outputted to the rotation shaft 12 when constant rotational torque is inputted into the rotation shaft 21. The horizontal axis in FIG. 4 represents the rotational angle of the rotation shaft 12, and the vertical axis represents the output torque.

The solid line in FIG. 4 represents a measurement result of a case where the magnetic bodies 40, 40 . . . are not placed in skew arrangement, that is, a case where the magnetic bodies 40, 40 . . . are arranged parallel to the axial direction of the stator 4, and the broken line likewise represents a result of a case where the skew arrangement illustrated in FIG. 3 is employed. It is to be understood from comparison of the lines that the output torque of the rotation shaft 12 fluctuates largely according to change in a rotational angle in the case represented by the solid line where skew arrangement is not employed, while the fluctuation range of the output torque is small in the case represented by the broken line where skew arrangement is employed, and therefore skew arrangement of the magnetic bodies 40, 40 . . . is effective for reduction of cogging torque, and stable transmission with small torque fluctuation can be realized. Though it is to be understood that the output torque represented by the broken line is slightly smaller than the output torque represented by the solid line as a whole and deterioration of torque density is caused by skew arrangement, it is to be noted that the deterioration amount is small.

The long dashed short dashed line in FIG. 4 represents the result of a case where the magnets 10, 10 . . . on the outer rotor 1 are placed in skew arrangement as with the magnetic bodies 40, 40 . . . , and the long dashed double-short dashed line represents the result of a case where the magnets 20, 20 . . . on the inner rotor 2 are likewise placed in skew arrangement. It is to be understood from the results that skew arrangement of the magnets 10 or 20 also has certain effect on reduction of cogging torque. Furthermore, it was confirmed that skew arrangement of both of the magnets 10, 10 . . . on the outer rotor 1 and the magnets 20, 20 . . . on the inner rotor 2 in the same direction enables torque transmission with a fluctuation range equal to that of the case where the magnetic bodies 40, 40 . . . on the stator 4 are placed in skew arrangement. Accordingly, the present invention includes not only a structure wherein the magnetic bodies 40, 40 . . . are placed in skew arrangement but also a structure wherein the magnets 10, 10 . . . on the outer rotor 1 and the magnets 20, 20 . . . on the inner rotor 2 are placed in skew arrangement in the same direction. In such a case, it is to be noted that the magnetic bodies 40, 40 . . . are arranged parallel to the axial direction of the stator 4 without skew.

Figure 5:
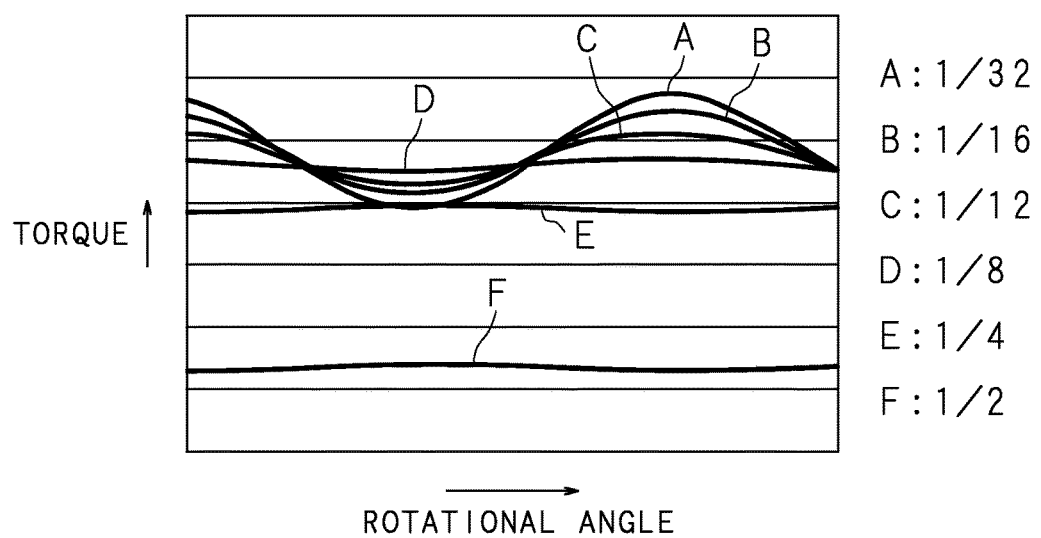
FIG. 5 is a drawing which illustrates a relation between the skew amount and the transmission torque.

FIG. 5 is a drawing which illustrates a relation between the skew amount and the transmission torque, and illustrates a measurement result of output torque to be outputted to the rotation shaft 12 when constant rotational torque is inputted into the rotation shaft 21 as in FIG. 4. The horizontal axis in FIG. 5 represents the rotational angle of the rotation shaft 12, and the vertical axis represents the output torque.

The lines A to F in FIG. 5 represent cases where the deviation amount (which will be hereinafter referred to as skew amount X) in the circumferential direction between one axial end and the other axial end of each magnetic body 40 is varied. The line A in the figure represents the result of a case where the ratio (=X/P) of a skew amount X to a juxtaposition pitch P of the magnetic bodies 40 is $1/32$, and the lines B to F in the figure respectively represent the result of cases where X/P is $1/16$, $1/12$, $1/8$, $1/4$ and $1/2$.

Referring to this figure, it is clear that the cogging torque reduction effect is a limited effect in the cases A and B where the skew amount X is small, while the cogging torque reduction effect is large and the fluctuation range of output torque becomes remarkably small in the cases C to F where the skew amount is large and X/P is equal to or larger than $1/12$. Especially, the cogging torque reduction effect is notable in the cases D to F where X/P is equal to or larger than $1/8$. On the other hand, the case F where X/P is $1/2$ has a problem that the output torque considerably deteriorates as a whole, which causes deterioration of torque density.

As is clear from the above results, it is appropriate to set the skew amount X (deviation amount in the circumferential direction between one axial end and the other axial end) of the magnetic bodies 40, 40 . . . to be $1/12$ to $1/4$ (more desirably, $1/8$ to $1/4$) of the juxtaposition pitch P of the magnetic bodies 40, 40 . . . , and skew arrangement under such a condition can suppress deterioration of torque density and also achieve efficient reduction of cogging torque, and can realize power transmission with high torque density under small torque fluctuation.

A similar result was obtained with the aforementioned structure wherein the magnets 10, 10 . . . on the outer rotor 1 and the magnets 20, 20 . . . on the inner rotor 2 are placed in skew arrangement in the same direction. Regarding skew arrangement of the magnets 10, 10 . . . and the magnets 20, 20 . . . , it is also desirable to set the skew amount on the basis of the juxtaposition pitch of the magnetic bodies 40, 40 . . . on the stator 4 to correspond to $1/12$ to $1/4$ of the juxtaposition pitch.

Figure 6:
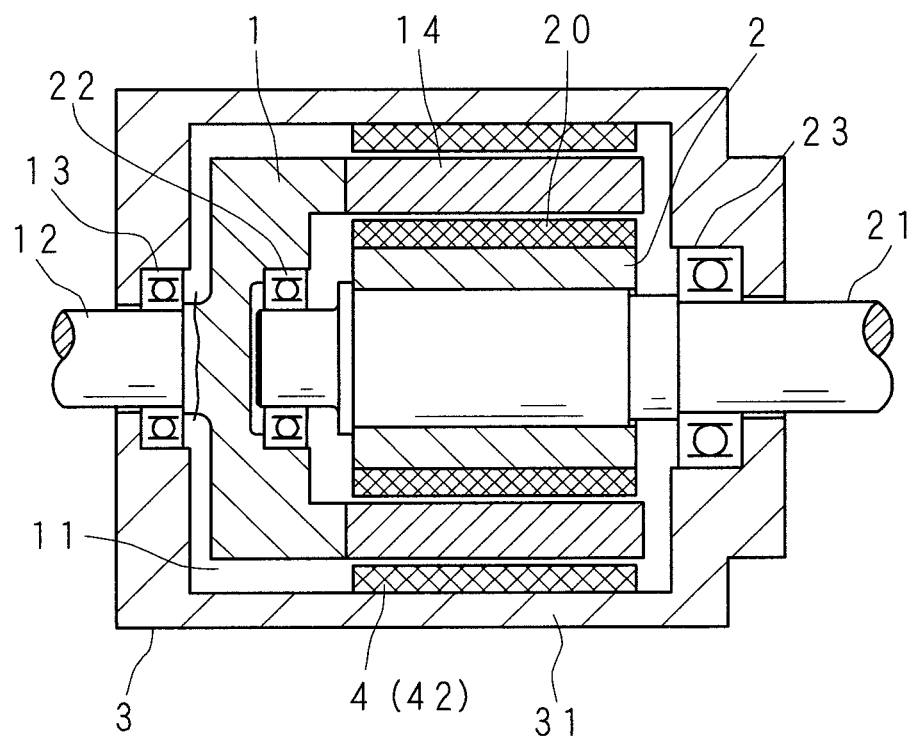
FIG. 6 is a longitudinal sectional view which schematically illustrates a magnetic gear device according to Embodiment 2.

Although the outer rotor 1 and the inner rotor 2 respectively constitute an outer magnet cylinder and an inner magnet cylinder and the stator 4 constitutes a magnetic body cylinder in Embodiment 1, such a structure can be suitably changed. FIG. 6 is a longitudinal sectional view which schematically illustrates a magnetic gear device according to Embodiment 2. An inner rotor 2 in this FIGURE constitutes an inner magnet cylinder 2 wherein a plurality of magnets 20 are uniformly arranged on the outer circumference as in Embodiment 1, while an outer rotor 1 constitutes a magnetic body cylinder wherein a plurality of magnetic bodies 14 are aligned at equal intervals in the circumferential direction and held by nonmagnetic holders (illustration of which is omitted) respectively located between magnetic bodies 14. Furthermore, a stator 4 constitutes an outer magnet cylinder 31 wherein a plurality of magnets 42 are uniformly arranged on the inner circumference of a housing 3. Since the support structure for the outer rotor 1 and the inner rotor 2 is similar to that of Embodiment 1, reference symbols equal to FIG. 1 are respectively attached to a corresponding component and explanation thereof is omitted.

The magnetic gear device illustrated in FIG. 6 has a structure wherein the inner rotor 2 which functions as an inner magnet cylinder 2, the stator 4 which functions as an outer magnet cylinder 31, and the outer rotor 1 which functions as a magnetic body cylinder interposed therebetween are supported coaxially. When the inner rotor 2 is rotated by the operation of rotational torque applied to the rotation shaft 21, for example, the magnets 20, 20 . . . uniformly arranged on the outer circumference relatively rotate and successively cross the magnetic bodies 14, 14 . . . juxtaposed on the outer rotor 1, and magnetic force of each magnet 20 is modulated by the magnetic bodies 14, 14 . . . , so that magnetomotive force having a different waveform is given to the magnets 42, 42 . . . on the stator 4, and rotational torque of the inner rotor 2 is transmitted to the outer rotor 1 and is extracted to the rotation shaft 12 of the outer rotor 1.

In Embodiment 2, cogging torque can also be reduced by placing the magnetic bodies 14, 14 . . . juxtaposed on the outer rotor 1 in skew arrangement with a skew amount corresponding to $1/12$ to $1/4$ of the juxtaposition pitch as in Embodiment 1. Moreover, cogging torque can also be reduced by placing the magnets 20, 20 . . . uniformly arranged on the inner rotor 2 and the magnets 42, 42 . . . uniformly arranged on the stator 4 in skew arrangement in the same direction and setting the respective skew amounts at $1/12$ to $1/4$ of the juxtaposition pitch of the magnetic bodies 14, 14 . . . .

Although the inner magnet cylinder and the magnetic body cylinder function as rotors and the outer magnet cylinder functions as a stator in Embodiment 2, the present invention may have a structure wherein an inner magnet cylinder functions as a stator and an outer magnet cylinder and a magnetic body cylinder function as rotors.

It is to be noted that embodiments disclosed herein are to be regarded as illustrative in all aspects and not restrictive. The metes and bounds of the present invention are defined not by contents of this specification but by the appended claims, and are intended to include all changes within the scope and meanings equal with the claims.

It is to be noted that, as used herein and in the appended claims, the singular forms "a", "an", and "the" include plural referents unless the context clearly dictates otherwise.

The invention claimed is:
1. A magnetic gear device, comprising:
  a cylindrical inner magnet cylinder having a plurality of magnets juxtaposed on the outer circumference;
  a cylindrical outer magnet cylinder having a plurality of magnets juxtaposed on the inner circumference; and
  a cylindrical magnetic body cylinder having a plurality of magnetic bodies juxtaposed at equal intervals in the circumferential direction,
  wherein the inner magnet cylinder, the outer magnet cylinder and the magnetic body cylinder are supported in a coaxial manner with the magnetic body cylinder interposed between the inner magnet cylinder and the outer magnet cylinder,
  wherein any two of the inner magnet cylinder, the outer magnet cylinder and the magnetic body cylinder function as rotors and the other functions as a stator so as to transmit rotational torque,
  wherein the magnetic bodies have rod shapes extending parallel to the axial direction of the magnetic body cylinder, and
  wherein the magnets on the inner magnet cylinder and the magnets on the outer magnet cylinder are placed in skew arrangement with deviation in the same direction in the respective circumferential directions.
2. The magnetic gear device according to claim 1, wherein the deviation amount of the magnets on the inner magnet cylinder and the deviation amount of the magnets on the outer magnet cylinder are set at $\frac{1}{12}$ to $\frac{1}{40}$ of the juxtaposition pitch of the magnetic bodies on the circumstance of the magnetic body cylinder.

* * * * *